United States Patent
Tourret et al.

(10) Patent No.: US 12,431,557 B2
(45) Date of Patent: Sep. 30, 2025

(54) BATTERY PACK WITH COOLING CIRCUIT

(71) Applicant: RENAULT S.A.S, Boulogne-Billancourt (FR)

(72) Inventors: Thierry Tourret, Gambais (FR); David Leray, Gif sur Yvette (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 544 days.

(21) Appl. No.: 17/784,561

(22) PCT Filed: Dec. 10, 2020

(86) PCT No.: PCT/EP2020/085556
§ 371 (c)(1),
(2) Date: Jun. 10, 2022

(87) PCT Pub. No.: WO2021/116297
PCT Pub. Date: Jun. 17, 2021

(65) Prior Publication Data
US 2023/0006284 A1    Jan. 5, 2023

(30) Foreign Application Priority Data

Dec. 13, 2019 (FR) ..................................... 19 14383

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/625* (2015.04); *H01M 10/0525* (2013.01); *H01M 2220/20* (2013.01)

(58) Field of Classification Search
None
See application file for complete search history.

(56) References Cited

U.S. PATENT DOCUMENTS

| | | |
|---|---|---|
| 2010/0104927 A1 | 4/2010 | Albright |
| 2015/0056481 A1 | 2/2015 | Cohen et al. |
| 2020/0101335 A1* | 4/2020 | Liu ..................... H01M 50/204 |

FOREIGN PATENT DOCUMENTS

| | | | |
|---|---|---|---|
| CN | 106252543 B  *  | 4/2019 | ............ H01M 10/39 |
| EP | 3 544 107 A1 | 9/2019 | |

OTHER PUBLICATIONS

Machine english translation of CN106252543B, Li et al. (Year: 2019).*

(Continued)

*Primary Examiner* — Ryan S Cannon
*Assistant Examiner* — Karen J. Armstrong
(74) *Attorney, Agent, or Firm* — Oblon, McClelland, Maier & Neustadt, L.L.P.

(57) ABSTRACT

A battery pack of an electric or hybrid motor vehicle, which is constituted by an upper casing and a lower casing, is provided with a cooling circuit which enables circulation in the pack of a cooling fluid which is intended to be sprayed onto battery modules by spray nozzles. The cooling circuit is suitable for ensuring circulation of the cooling fluid in a closed circuit inside the pack, with a pump which is arranged in the internal vessel of the pack being capable of recirculating, back to the spray nozzles, the cooling fluid which is sprayed onto the modules and collected in a double base arranged under a base wall of the lower casing by discharge openings which are formed in the base wall of the lower casing.

7 Claims, 3 Drawing Sheets

(51) Int. Cl.
  *H01M 10/625* (2014.01)
  *H01M 10/0525* (2010.01)

(56) References Cited

OTHER PUBLICATIONS

Machine english translation of EP 3544107-A1 Tourret (Year: 2019).*
International Search Report issued on Jan. 20, 2021 in PCT/EP2020/085556 filed on Dec. 10, 2020, 2 pages.
French Preliminary Search Report issued Aug. 25, 2020 in French Application 19 14383, filed on Dec. 13, 2019, 7 pages (with English Translation of Categories of Cited documents & Written Opinion).

* cited by examiner

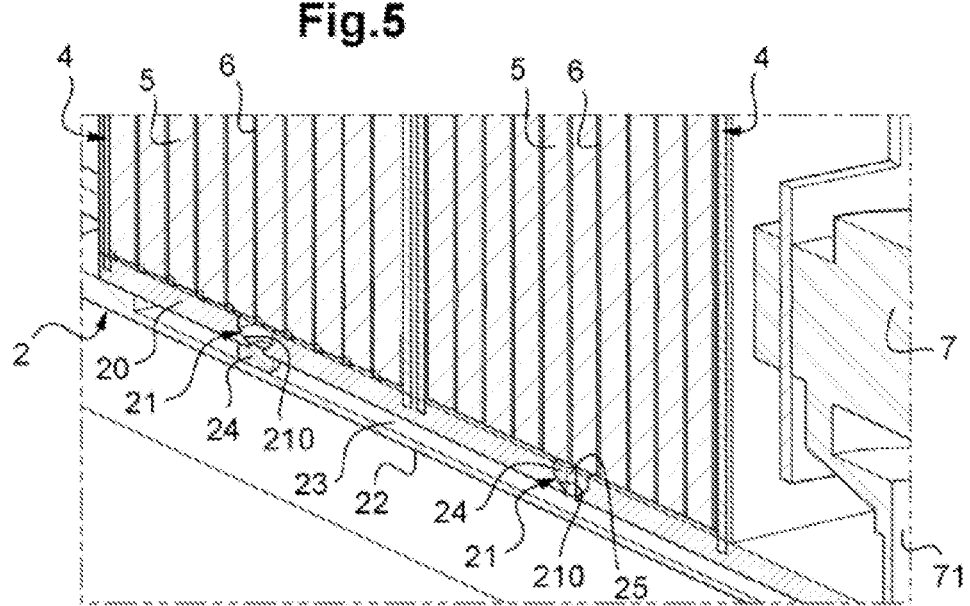

BATTERY PACK WITH COOLING CIRCUIT

BACKGROUND

The present invention relates to a battery pack for receiving at least one battery module comprising a plurality of interconnected cells and provided with a cooling circuit for circulating a cooling fluid in the pack.

The invention applies in particular, but not exclusively, to lithium-ion (Li-ion) batteries for powering the drive train of electric or hybrid vehicles.

Due to their high voltage and high energy density, Li-ion batteries are particularly suitable for powering the drive train of an electric or hybrid vehicle. In such a battery, a Li-ion cell is an elementary component, which contains a certain amount of electrolyte, through which lithium ions can migrate between a cathode and an anode, in order to store or deliver electrical energy. In a Li-ion battery, a plurality of Li-ion cells are first assembled and connected in series and/or in parallel to form a module, and then a plurality of modules are assembled and connected in series and/or in parallel to form a 'pack'. Thus, a battery pack generally comprises a plurality of interconnected modules, which are in turn formed by a plurality of interconnected cells, and a support structure for its various elements.

In the event of a failure of one or more cells in a battery pack, a thermal runaway phenomenon may be triggered inside the cells. In the absence of safety devices such as those implemented by the applicant, this thermal runaway phenomenon can spread to the entire pack and lead to a fire as soon as the cells cross a temperature threshold. As this is a chemical fire, it is very difficult to extinguish, especially considering the fact that it confined in the almost hermetically sealed chamber formed by the pack.

Patent document CN106110537 discloses a device for protecting against the risk of fire in the event of thermal runaway of a Li-ion battery, The battery is provided with a temperature sensor as well as a water supply circuit and a liquid nitrogen supply circuit, allowing water and liquid nitrogen respectively to be circulated in the battery pack. When the temperature detected exceeds a certain threshold, one or the other of the two water and liquid nitrogen supply circuits is activated in order to cool the battery during an initial phase of thermal runaway of a battery cell and, if necessary, to extinguish a fire when the battery is on fire. In particular, when the temperature is between a low and a high temperature threshold, the liquid nitrogen supply circuit is activated, causing liquid nitrogen to be sprayed from above onto the battery cells, and when the temperature becomes higher than the high threshold, the liquid nitrogen spray is stopped, whereas the water supply circuit is activated, causing a water mist to be sprayed from above onto the battery cells.

This device is relatively complex to produce since it requires providing the battery with two different cooling circuits, specifically the liquid nitrogen supply circuit and the water supply circuit, to the detriment of space and cost. Moreover, the simple action of spraying liquid nitrogen or water from above onto the cells of the battery modules might not be sufficient to prevent a Lire in the event of an excessive rise in temperature, or to ensure that it is completely extinguished.

BRIEF SUMMARY

An objective of the invention is thus to propose a battery pack free of at least one of the previously mentioned limitations.

To this end, the invention relates to a battery pack for an electric or hybrid motor vehicle, said battery pack being formed by an upper housing and a lower housing delimiting an internal chamber in which there is housed at least one battery module comprising a plurality of interconnected electrochemical cells, the pack being provided with a cooling circuit allowing the circulation in the pack of a cooling fluid intended to be sprayed onto said at least one module by means of spray nozzles, characterized in that the cooling circuit is suitable for ensuring circulation of the cooling fluid in a closed circuit within the pack, with a pump arranged in the internal chamber being capable of recirculating, to the spray nozzles by means of discharge orifices formed in the base wall of the lower housing, the cooling fluid sprayed onto said at least one module and collected in a double base provided under a base wall of the lower housing.

Thanks to this arrangement with, on the one hand, discharge orifices formed in the base wall of the lower housing, allowing the cooling fluid flowing down along the cells of said at least one module to be collected in a double base of the lower housing, and, on the other hand, the pump allowing this collected fluid to be recirculated to the spray nozzles, the cooling fluid is circulated in a closed circuit inside the pack. The pack is thus particularly compact and less bulky.

Advantageously, a hot-melt sealing element is placed inside each discharge orifice, said sealing element being capable of melting so as to allow the sealing of said at least one discharge orifice when a determined temperature threshold is reached, preventing the discharge, towards the double base of the lower housing, of the cooling fluid sprayed onto said at least one module, so as to allow the cells of said at least one module to be immersed.

Thanks to this arrangement, each discharge orifice towards the double base can be closed in case of an excessive temperature rise. The temperature threshold is suitable for causing the hot-melt sealing elements to melt upon initiation of a thermal runaway phenomenon within the cells, which may then ignite within the pack. This allows the level of cooling fluid that continues to be sprayed onto the cells in said at least one module to rise until the cells are submerged. This effectively stops the spread of the cell fire.

Advantageously, the spray nozzles are arranged on an inner wall of the upper housing, said upper housing comprising an outer wall spaced from said inner wall so as to form an internal cavity in said upper housing, the pump being connected to the spray nozzles by means of a conduit opening into said internal cavity in order to inject said cooling fluid therein.

Advantageously, a through-hole opening into the double base of the lower housing is formed in the base wall of the lower housing for the passage of the cooling fluid, the pump having a suction spout engaged through said through-hole and dipping into the double base.

Advantageously, the plurality of cells is juxtaposed in a receiving volume of each module with at least one space between two elementary cells of said at least one module, so as to allow the passage of the cooling fluid between two cells of said at least one module.

Advantageously, the space is formed by a partition plate extending between two cells, the opposite faces of said plate being grooved to create fluid passage channels along the cells.

The invention also relates to a motor vehicle comprising an electric drive train, characterized in that said motor vehicle comprises a battery pack as described above.

BRIEF DESCRIPTION OF THE DRAWINGS

Further features and advantages of the invention will become clear from the description hereinafter, which is provided by way of example and no way in a limiting manner, with reference to the appended drawings, in which:

FIG. 5 is a perspective, cross-sectional view of a detail of the lower portion of the battery pack with two discharge orifices formed at the base of the lower housing, shown in the plugged and unplugged configuration, respectively.

DETAILED DESCRIPTION

Figure 1:
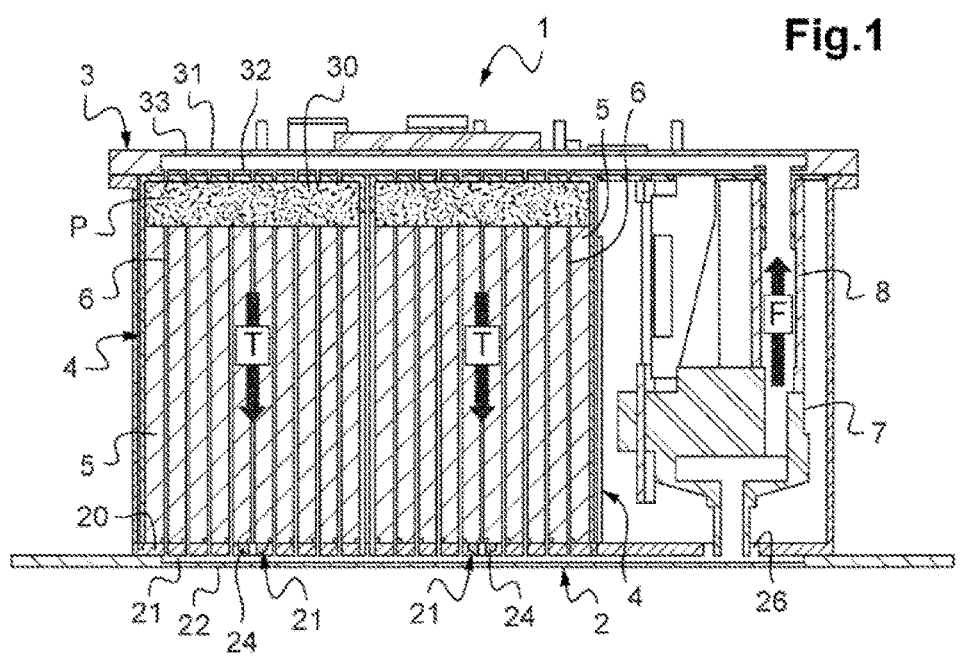
FIG. 1 is a vertical cross-sectional view of a battery pack according to an exemplary embodiment according to the invention.
Figure 2:
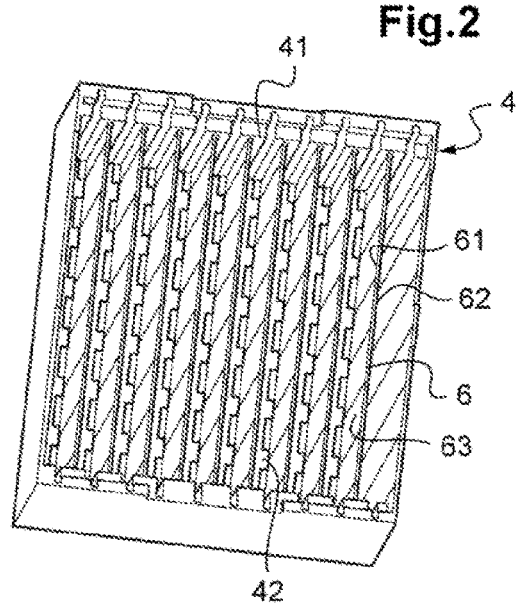
FIG. 2 is a perspective view of a battery pack module shown in FIG. 1.

FIG. 1 is a cross-sectional view of the side of a traction battery pack 1 of an electric or hybrid motor vehicle, provided with at least one electric drive train. The pack 1 is formed substantially by a lower housing 2, for example made of aluminum, closed by an upper housing 3, also made of aluminum. The lower housing 2 and upper housing 3 delimit an internal chamber in which there is disposed at least one and preferably a plurality of modules 4 of interconnected electrochemical cells 5, of the Li-ion type. According to the example, the pack 1 encloses two modules 4 of ten interconnected electrochemical cells 5, preferably of parallelepiped shape. For each of the modules 4, the cells 5 are held parallel to each other and at a distance from each other by partition plates 6, the role of which is to allow the passage of a cooling fluid, sprayed from above the modules, between the cells. FIG. 2 shows a perspective view of a detail of a module 4, and inside the latter the partition plates 6, regularly spaced and arranged parallel to each other, between which the cells as shown in FIG. 1 will be inserted. The module 4 is formed by a casing with a substantially square cross-section, with an upper opening 41, opposite a lower opening 42. Inside the casing 4, each of the partition plates 6 extends substantially over the full height of the casing 4 and has two opposite surfaces 61, 62. The two opposite surfaces 61, 62 of the plates 6 are grooved. Thus, they have grooves 63 that extend over the entire height of the plates 6 between the upper and lower openings of the module casing 4.

Referring again to FIG. 1, the upper housing 3 has an internal cavity 33 formed by two opposite walls, specifically an external wall 31 and an internal wall 32, spaced apart from each other, extending in line with the two modules 4 of cells 5 housed in the battery pack 1. The inner wall 32 is provided with a plurality of spray nozzles 30 facing the upper opening 41 of the modules and the cells arranged therein. The spray nozzles 30 are provided to allow the spraying of a cooling fluid injected into the internal cavity 33 of the upper housing 3, as will be described in more detail later, onto the battery modules 4 arranged in the internal chamber of the pack below the upper housing 3 thereof. The cooling fluid is a dielectric fluid, that is to say it is not a charge carrier, so as not to short-circuit the cells. The heat transfer fluid is, for example, a polyethylene glycol or a mineral oil.

The cooling fluid thus sprayed by the spray nozzles 30 onto the upper portion of the battery modules 4 flows between the cells 5 and the partition plates 6 of the battery modules, along the grooves, to the base 20 of the lower housing 2. In this way, a heat exchange takes place between the cells and the cooling fluid, so that the thermal energy released by the cells can be dissipated.

Figure 3:
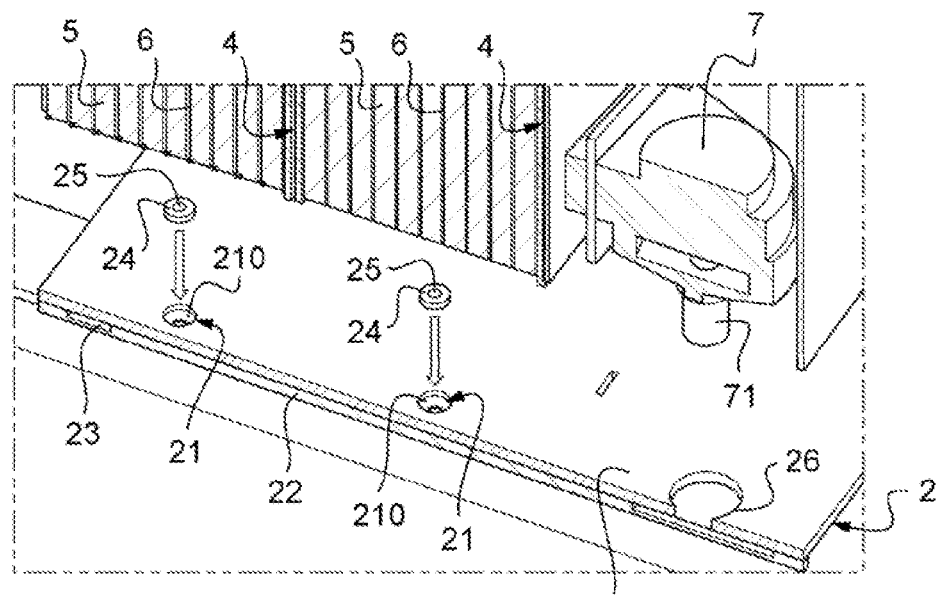
FIG. 3 an exploded, perspective, cross-sectional view of a detail of a lower portion of the battery pack shown in FIG. 1.
Figure 4:
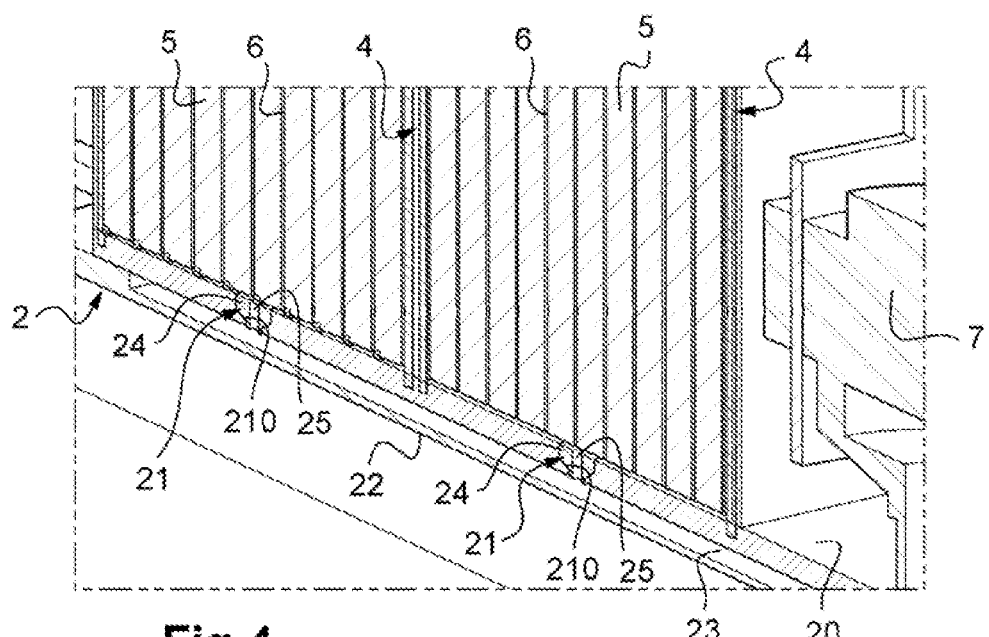
FIG. 4 is a non-exploded, perspective, cross-sectional view of a detail of the lower portion of the battery pack shown in FIG. 1.

As can be best seen in FIGS. 3 and 4, which illustrate a perspective view of a detail of the lower portion of the pack 1, in an exploded and non-exploded view respectively, it is provided that the heated cooling fluid then flows by gravity through discharge orifices 21 formed in a base wall 20 of the lower housing 2, preferably comprising at least one discharge orifice formed opposite the lower opening 42 of each of the modules 4 arranged in the pack. The heated cooling fluid collected by the discharge orifices 21 is conveyed through these orifices 21 into a double base 23 of the lower housing 2 formed by a lower wall 22 of the lower housing 2 opposite the base wall 20 of the lower housing 2, the two walls, that is to say lower wall 22 and base wall 20, of the lower housing being spaced apart from each other. The double base 23 of the lower housing thus extends under the base wall 20 of the lower housing 2, facing the lower opening of the modules.

The double base 23 of the lower housing 2 and the internal cavity 33 of the upper housing are connected to each other by means of a pump 7, located in the chamber of the battery pack 1, next to the modules 4. For this purpose, the inner wall 32 of the upper housing 3 has, substantially in line with the pump 7, an orifice 34, opening into the inner cavity 33 of the upper housing 3. There is mounted on said orifice 34 a connector fitted into a supply pipe 8, extending to the pump 7.

Furthermore, the base wall 20 of the lower housing 2 has a through-hole 26 in the region of the pump 7, said through-hole opening into the double base 23 of the lower housing 2. The pump 7 has a suction spout 71, which is inserted through the through-hole 26 and dips into the double base 23 of the lower housing 2.

The switching-on of the pump 7 thus causes the cooling fluid to circulate in a closed circuit inside the pack 1 as follows. First, the cooling fluid is drawn into the double base 23 of the lower housing through the through-hole 26. The cooling fluid is considered to be cold at the through-hole 26. It is then sucked in through the suction spout 71 of the pump 7, and is delivered under pressure through the supply line 8, as shown by the arrow F. The cooling fluid then flows under pressure into the inner cavity 33 of the upper housing 3. It is then injected under pressure through the spray nozzles 30 so as to form a spray mist P above the modules 4. The cooling fluid then flows by gravity along the cells 5 in the passage channels formed by the grooves 63 of the partition plates 6, arranged between the cells 5, according to the arrows T. On contact with the cells 5, the cooling fluid stores the thermal energy produced by them, then flows by gravity over the base wall 20 of the lower housing 2, to then flow through the discharge orifices 21 inside the double base 23 of the lower housing 2. The thermal energy accumulated from contact with the cells then tends to be lost from the heated cooling fluid to the lower wail 22, which is for example exposed to the ambient air. As the distance between the lower wall 22 and the base wall 20 is small compared to their surface area, the cooling fluid is in the form of a thin layer through the double base 23 of the lower housing, and therefore its cooling is rapid. Consequently, when the cooling fluid is again sucked through the through-hole 26, it is considered to be cold, thus starting another cooling cycle of the cells 5.

However, in the event of a thermal runaway of a cell in one or more battery modules, the battery cells may ignite within the pack, once they cross a temperature threshold. The cooling cycle of the battery cells just described might not be sufficient to prevent or contain the spread of this fire.

Thus, the discharge orifices 21 are each provided with a hot-melt sealing element 24, incorporated within the orifice and intended to allow said discharge orifices to be sealed in the event of an excessive rise in temperature and thus allow the modules to be submerged. The hot-melt sealing elements 24 are in the form of a pellet made of hot-melt material, placed inside each discharge orifice 21 and having a central bore 25 to allow the passage of the cooling fluid towards the double base 23 of the lower housing 2, each pellet having the ability to melt in order to block the discharge orifice 21 when a predetermined temperature is reached.

By way of example and as can be seen most clearly in FIG. 5, each discharge orifice 21 formed in the base wall 20 of the lower housing 2 is delimited by a substantially frustoconical inner peripheral face 210, converging from top to bottom, between an upper opening 211 on the side of the internal chamber and a lower opening 212 on the side of the double base 23 of the lower housing 2. The hot-melt pellets 24 are incorporated within the discharge orifices 21 in such a way as to match their inner peripheral face 210, while the central bore 25 of the pellets provides a passage for the cooling fluid between the upper openings 211 and lower openings 212 of the discharge orifices 21. Thus, by melting when a predetermined temperature is reached, the hot-melt material of the pellet 24 flows into the double base 23 and agglomerates upon contact with the inner wall 22 at the lower opening 212 of the discharge orifice 21, until it forms a plug that closes said opening. The discharge orifice 21 on the left in FIG. 5 is illustrated in this plugged configuration. The hot-melt pellet 24 associated with each discharge orifice 21 thus makes it possible to block the fluid passage formed below a module towards the double base 23 of the lower housing 2, when a predetermined temperature is reached, preventing the discharge of the cooling fluid into the double base 23 of the lower housing 2.

The melting of a hot-melt pellet 24 associated with a discharge orifice 21 located below a module 4 of the battery causes the module to be filled with the cooling fluid, which continues to spray the cells from above, thus allowing the cells to be at least partially submerged within the module. This arrangement is particularly effective in stopping the spread of a fire in the event of the initiation of a thermal runaway phenomenon inside the cells.

The invention claimed is:

1. A battery pack of an electric or hybrid motor vehicle, said battery pack comprising:
    an upper housing and a lower housing delimiting an internal chamber in which there is housed at least one battery module comprising a plurality of interconnected electrochemical cells,
    a cooling circuit configured to allow the circulation in the pack of a cooling fluid to be sprayed onto said at least one module by spray nozzles,
    wherein the cooling circuit is configured to ensure circulation of the cooling fluid in a closed circuit within the pack, with a pump arranged in the internal chamber that is configured to recirculate, to the spray nozzles by discharge orifices formed in a base wall of the lower housing, the cooling fluid sprayed onto said at least one module and collected in a double base provided under the base wall of the lower housing, and
    wherein the battery pack further comprises a hot-melt sealing element placed inside each discharge orifice and configured to melt so as to allow the sealing of said discharge orifice when a determined temperature threshold is reached, preventing the discharge, towards the double base of the lower housing, of the cooling fluid sprayed onto said at least one module, so as to allow the cells of said at least one module to be immersed, and wherein the hot-melt sealing element comprises a central bore to provide passage for the cooling fluid through the hot-melt sealing element while the hot-melt sealing element is below the temperature threshold.

2. The battery pack as claimed in claim 1, wherein the spray nozzles are arranged on an inner wall of the upper housing, said upper housing comprising an outer wall spaced from said inner wall so as to form an internal cavity in said upper housing, the pump being connected to the spray nozzles by a conduit opening into said internal cavity in order to inject said cooling fluid therein.

3. The battery pack as claimed in claim 1, wherein a through-hole opening into the double base of the lower housing is formed in the base wall of the lower housing for the passage of the cooling fluid, the pump having a suction spout engaged through said through-hole and dipping into the double base.

4. The battery pack as claimed in claim 1, wherein the plurality of cells is juxtaposed in a receiving volume of said at least one module with at least one space between two elementary cells of each module, so as to allow the passage of the cooling fluid between the cells of said at least one module.

5. The battery pack as claimed in claim 4, wherein the space is formed by a partition plate extending between two cells, the opposite faces of said plate being grooved to create fluid passage channels along the cells.

6. The battery pack as claimed in claim 1, wherein the cells are Li-ion cells.

7. A motor vehicle comprising:
    an electric drive train; and
    the battery pack as claimed in claim 1.

* * * * *